(No Model.) 4 Sheets—Sheet 1.

J. W. HILL.
FUMIGATOR.

No. 586,768. Patented July 20, 1897.

Witnesses:
A. M. Belfield
L. A. Gardiner

Inventor:
John W. Hill
by Hill & Hill
Att'ys.

(No Model.) 4 Sheets—Sheet 2.
J. W. HILL.
FUMIGATOR.

No. 586,768. Patented July 20, 1897.

Witnesses:
A. M. Belfield.
L. A. Gardiner.

Inventor:
John W. Hill
by Hill & Hill
Att'ys.

(No Model.) 4 Sheets—Sheet 3.
J. W. HILL.
FUMIGATOR.
No. 586,768. Patented July 20, 1897.

Witnesses:
A. M. Belfield.
L. A. Gardiner.

Inventor:
John W Hill
by Hill & Hill
Att'ys.

(No Model.) 4 Sheets—Sheet 4.

J. W. HILL.
FUMIGATOR.

No. 586,768. Patented July 20, 1897.

Witnesses:
A. M. Belfield.
L. A. Gardiner.

Inventor:
John W. Hill
by N'cie & N'cie
Att'ys.

THE NORRIS PETERS CO., PHOTO-LITHO., WASHINGTON, D. C.

UNITED STATES PATENT OFFICE.

JOHN W. HILL, OF CHICAGO, ILLINOIS, ASSIGNOR, BY DIRECT AND MESNE ASSIGNMENTS, TO THE ACME FUMIGATOR COMPANY, OF SAME PLACE.

FUMIGATOR.

SPECIFICATION forming part of Letters Patent No. 586,768, dated July 20, 1897.

Application filed March 22, 1895. Serial No. 542,833. (No model.)

*To all whom it may concern:*

Be it known that I, JOHN W. HILL, a citizen of the United States of America, residing at Chicago, in the county of Cook and State of Illinois, have invented certain new and useful Improvements in Fumigators, of which the following is a specification.

Figure 1:
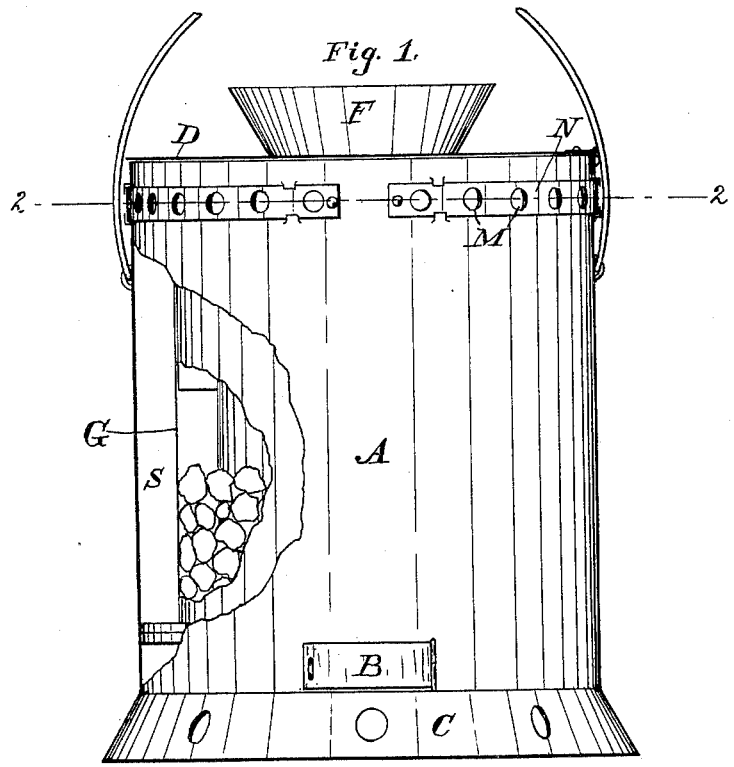
Figure 2:
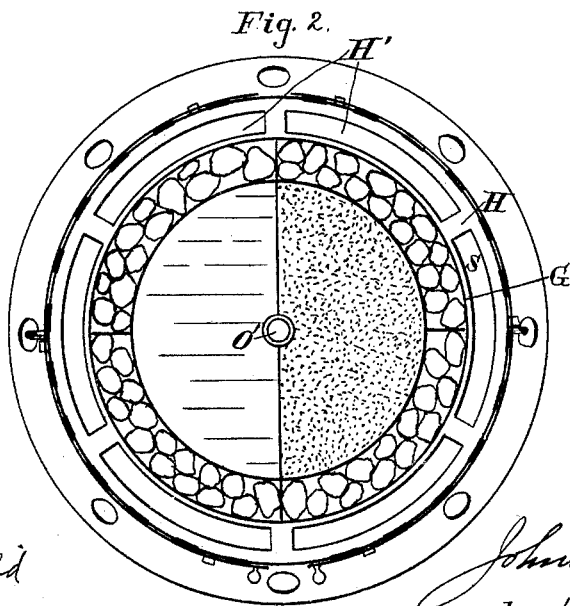
Figure 4:
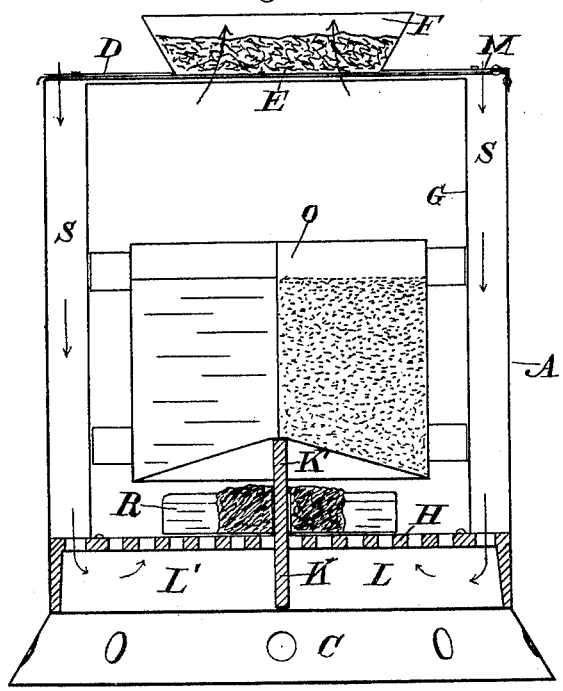
Figure 3:
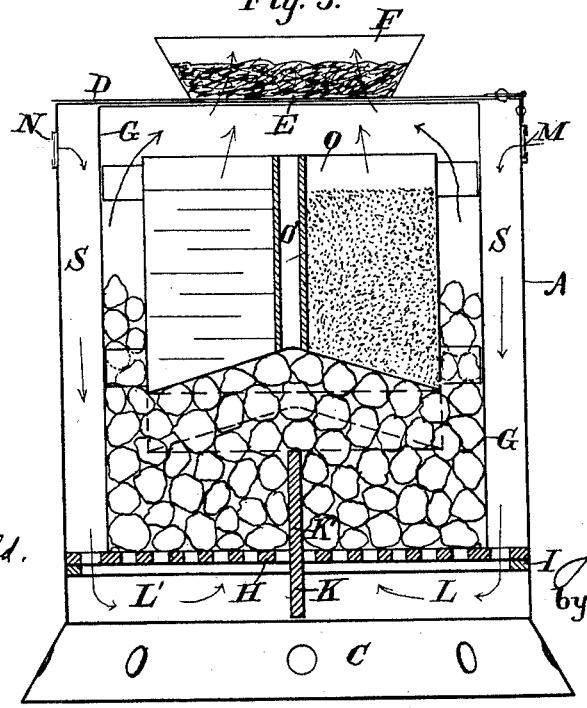
Figure 5:
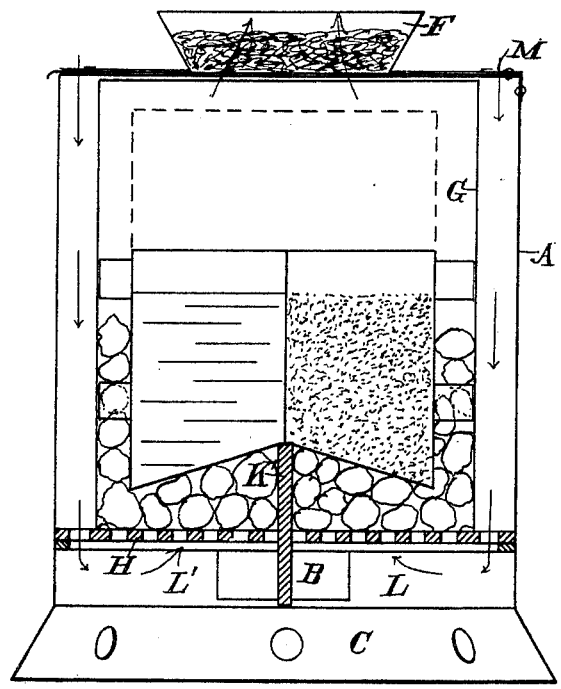
Figure 6:
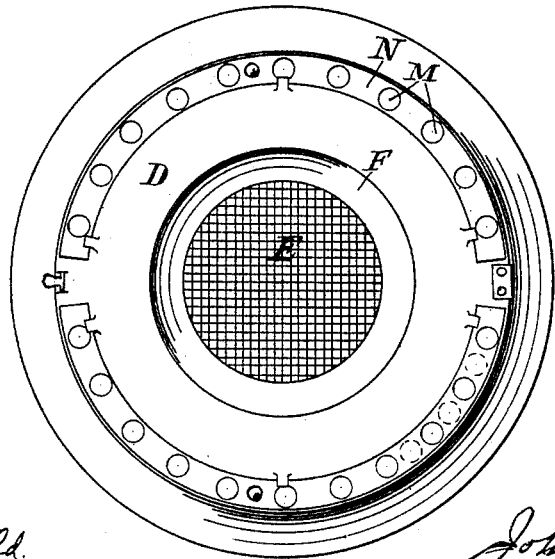
Figure 7:
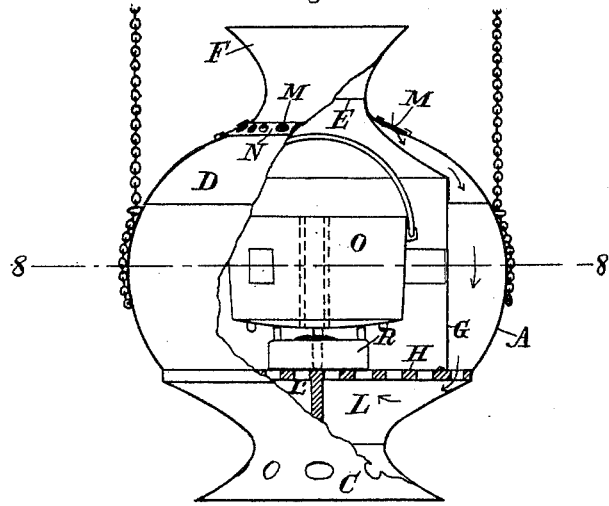
Figure 8:
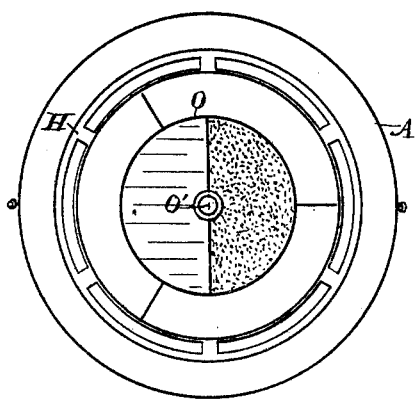

Referring to the accompanying drawings, wherein like reference-letters indicate like or corresponding parts, Figure 1 is an exterior view of one form of my improved device with parts broken away to show the interior arrangement. Fig. 2 is a horizontal section of the same in line 2 2 of Fig. 1. Fig. 3 is a vertical section of the same, more clearly disclosing its mode of operation. Fig. 4 is a vertical section of a slightly-modified form provided with a lamp for heating purposes in lieu of charcoal or its equivalent. Fig. 5 is a vertical section of the same with charcoal or its equivalent substituted in place of the lamp. Fig. 6 is a top plan of the same. Fig. 7 is a view of a modified form with parts broken away and is also adapted to the use of either the charcoal or the lamp, and Fig. 8 is a cross-section of the same in line 8 8 of Fig. 7.

The object of my invention is to improve the construction of a device adapted for use for fumigating or disinfecting purposes whereby the most perfect combustion of the heating material and consequent liberation of gases are secured, and the device is also perfectly adapted for either the dry method of disinfecting, the moist method, or the complete and perfect combination of both.

My object is also to provide a device adapted for use by medical men in treating those suffering from any disease which may be relieved or cured by inhaling a medicated vapor or atmosphere.

To this end my invention consists in a device in which in the simplest and most effective manner the necessary elements combine to cause the air in a room to circulate and pass through the combustion and mixing chamber again and again in order that it may all be freed from injurious germs or noxious gases.
It also consists in causing the passage of the air to the combustion and mixing chamber through a diving-flue to prevent the heat within the combustion-chamber from extending to the outer shell and thus cause damage by fire.
It also consists in causing the gases and fumes from the combustion and mixing chamber to pass through a sponge or an additional substance or compound, whereby they may be still further treated.
It also consists in the various arrangements and combinations of elements hereinafter described, and more particularly pointed out in the accompanying claims.

In the drawings, A represents the outer shell, which, if preferred, may be provided with a clean-out door B, and is preferably mounted upon a ventilated base C. A top or cover D is provided with a central grated or screened opening E for the escape of the vapor and gases from the combustion or mixing chamber. In the preferred construction the opening E is provided with an inclosing wall F, which thus forms a vessel-like part, of which the grate or perforated cover of the opening E is the bottom.

Perforations or draft-holes M are provided either in the outer edge of the top, as in Figs. 4, 5, and 6, or in the shell near its upper edge, as in Figs. 1, 2, 3, and 7, as preferred, and a sliding portion N or its equivalent, provided with a series of similar openings with unbroken portions between them, serves to control the admission of air to the device.

Within the device is located a grate H, which is held at an elevation above the bottom to permit the air to pass below it in any preferred manner—as, for example, by the ring I or by legs (not shown) cast upon the grate or the bottom. A central support is also usually provided, which, if preferred, may be a partition K, dividing the space below the grate into two parts L L'. Supported above the grate is an inner shell G, which is of a size that will leave a space between its exterior and the interior of the outer shell, which operates as a down draft-flue, by means of which the outer shell is kept from heating.

The shell G is preferably secured to the grate, and in preferred form the two are removable from the outer shell.

In the preferred form a support or partition K' extends above the grate for the purpose of arresting the descent of the vessel, and in some cases to aid in controlling the greater part of the combustion to one side or the other, as is later explained.

Within the shell G is positioned a removable vessel O, which is maintained in a central position within said shell by any preferred means—for example, by the extending arms P, which prevent it from being directed to either side. The heat is thus directed about it on all sides. In the preferred form a central flue O' is constructed in the vessel, as shown in Fig. 3, which aids materially in the operation of the device. The flue O need not necessarily be circular in cross-section, but may be square, oblong, or any other form preferred. The vessel is also preferably divided into two or more compartments, as shown.

When the device is intended for the use of doctors, &c., to disinfect sick-rooms or to release the beneficial properties of drugs for inhalations, &c., I prefer to use lamp R, which is charged with a quantity of any preferred material suitable for the purpose and is maintained in its position in any preferred way, as by a central post, as in Fig. 7, or it may be in two parts and be placed in position on either side of the partition, as shown in Fig. 4.

The mode of operation when fumigation is desired is as follows: The grate and inner shell are positioned within the outer shell, as shown in Figs. 3, 4, and 5. A quantity of combustible material, preferably charcoal, is then placed upon the grate and the vessel O placed in position. Before or after it is placed in position the vessel is charged with the antiseptic fluids or compounds, or with either one or the other, as preferred. For example, sulfur may be used singly when dry fumigation is desired, or sulfur and borax, placing a sufficient quantity of each in the separate compartments of the vessel or first mixing them, as preferred, or, if the moist process is desired, charging the vessel with the desired fluid. If the combined process is desired, then the fluid is placed in one compartment and the compound in the other. The device then being placed in the room to be disinfected, the charcoal is ignited and the room closed. The heated air arising and passing in the combustion and mixing chamber causes the air to circulate downward through the flue and the openings H' in the grate and beneath the fire, thus insuring perfect combustion, the rapidity of which is governed by the draft-slides. The heat also releases the gases and vapors from the substances in the vessels, and as the several gases or gases and vapors approach the exit E they become thoroughly mingled together. If now any substance, as camphor, menthol, peppermint, sage, &c., or simply a sponge-like substance, is placed in the vessel-like part F, the gases may thus be additionally treated, but excellent results are attained without such additional treatment.

When the device is used for treating the sick or for rooms in which persons may remain at the same time the process is going on, the lamp is used in place of the charcoal, and such drugs as will release disinfecting or medicinal vapors or fumes may be used, depending upon the specific disease treated.

It is obvious that after pointing out the advantages of my invention other forms may be employed without departing from the spirit of my invention. Hence I do not limit myself to the specific forms shown.

Having thus described my invention, what I claim as new, and desire to secure by Letters Patent, is—

1. In a disinfecting apparatus, the combination of the outer shell, a grate, an inner shell having imperforate sides extending to the grate, and arranged to form with the other a vertical flue, an opening or openings being provided, through which air may pass to the bottom of the grate, from said flue, means whereby air may pass directly from the atmosphere of the place being treated into the upper part of the flue, so as to prevent heating of the outer shell, and a disinfectant-holding vessel within the inner shell, a passage being provided to permit air passing upward through the grate, to pass such vessel and be charged with the vapors or fumes liberated from the material in the vessel, substantially as and for the purpose specified.

2. In a disinfecting apparatus, the combination of the outer shell, a grate supported above the bottom of the device and provided with an air-passage around its outer edge, an inner shell, above the grate, having imperforate sides, and extending down to the same, inside of said air-passage, and forming with the shell a cold-air flue, means for admitting air to the upper part of the flue, directly from the atmosphere of the place to be treated, and a vessel arranged within the inner shell to leave a space between it and said shell, for the passage of heated air, up around the vessel, substantially as and for the purpose specified.

3. In a disinfecting apparatus, the combination of the outer shell, a perforated cover therefor, a grate, an inner shell, above the grate, and extending down thereto, forming with the outer shell a cold-air flue, means for admitting air to the upper part of the flue directly from the atmosphere of the place to be treated, a passage for air from the flue to the space beneath the grate, and a vessel within the inner shell, around and by which air passing upward from the grate, may pass, substantially as and for the purpose set forth.

4. In a disinfecting apparatus, the combination of an outer shell, a cover having a perforated portion, a raised portion or wall around the latter, forming therewith a holder, a grate within the outer shell for the support of combustible material, an inner shell forming with the outer shell a flue, means for admitting air to the top of the flue, and a vessel within the inner shell, substantially as and for the purpose specified.

5. In a fumigator, the combination of an outer shell, a cover having a perforated portion, a raised wall, or part around the latter forming a holder, a grate within the outer shell for the support of combustible material, an inner shell forming with the outer shell a flue, means for controlling the admission of air to the flue, and a vessel within the inner shell, substantially as and for the purpose described.

6. In a fumigator, the combination of a shell having a suitable combustion-chamber, an uncovered vessel arranged within the latter to leave a space between them for the passage around the vessel of the products of combustion, and having a central, vertical passage for products of combustion, and means above the vessel for causing fumes or vapors given off from the contents thereof, to mingle with the products of combustion passing through said passage, substantially as and for the purpose set forth.

7. In a fumigator, the combination of the outer shell, the grate, the inner shell extending to the grate and forming with the outer shell a flue, means for admitting air to the upper part of the flue, an opening or openings being provided for air to pass from the flue below the grate, a vessel within the inner shell, a passage being provided to permit air to pass by the latter, and a lamp below the vessel to heat the same, substantially as and for the purpose described.

8. In a fumigator, the combination of the outer shell, the grate, the inner shell extending to said grate, and forming with the outer shell a diving-flue, means for controlling the admission of air to the upper part of the flue, an opening or openings being provided for air to pass from the flue, a removable vessel within the inner shell, a passage being provided to permit air to pass by the vessel, and a lamp below the vessel to heat the same, substantially as and for the purpose specified.

9. In a fumigator, the combination of the outer shell, a grate, an inner shell forming with the outer shell a diving-flue, means for admitting air to the upper part of said flue, means for passing air from said flue beneath the grate, a vessel within the inner shell, a cover, and a holder for a body of absorbent material attached to said cover, substantially as and for the purpose shown.

JOHN W. HILL.

Witnesses:
L. HILL,
L. A. GARDINER.